(No Model.)
H. N. MARVIN.
ELECTRIC DRILL SYSTEM.
No. 467,510. Patented Jan. 26, 1892.
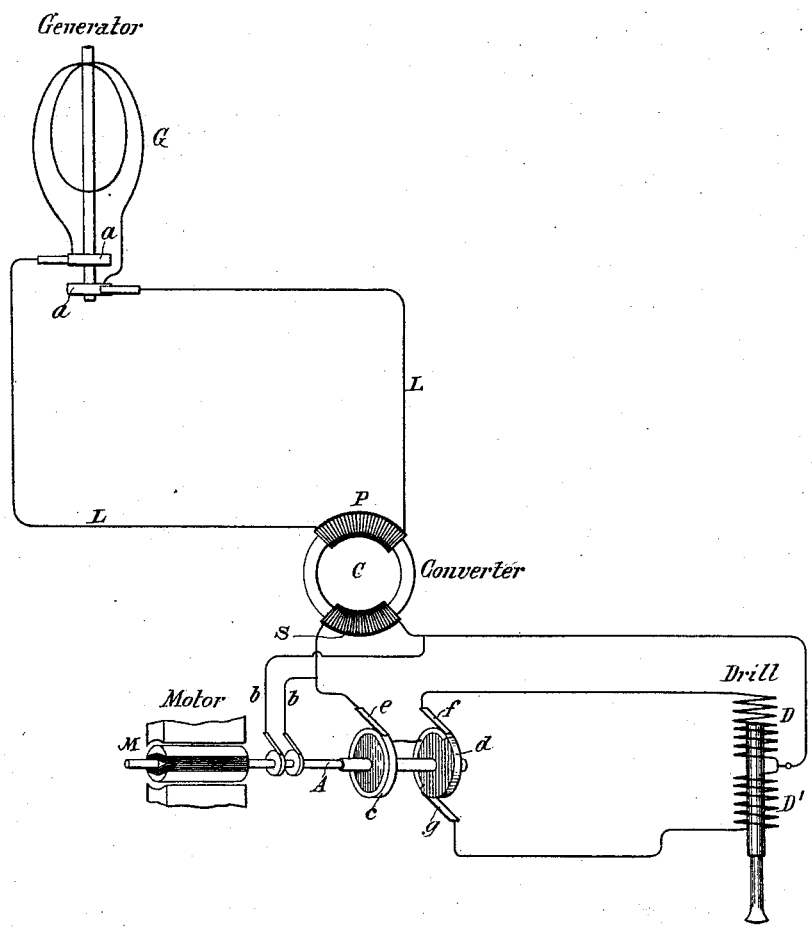

UNITED STATES PATENT OFFICE.

HARRY N. MARVIN, OF SYRACUSE, NEW YORK, ASSIGNOR TO THE MARVIN ELECTRIC DRILL COMPANY, OF SAME PLACE.

ELECTRIC-DRILL SYSTEM.

SPECIFICATION forming part of Letters Patent No. 467,510, dated January 26, 1892.

Application filed August 21, 1891. Serial No. 403,303. (No model.)

*To all whom it may concern:*

Be it known that I, HARRY N. MARVIN, a citizen of the United States, residing at Syracuse, in the county of Onondaga and State of New York, have invented certain new and useful Improvements in Electric-Drill Systems, of which the following is a specification, reference being had to the drawing accompanying and forming a part of the same.

My present invention is an improvement in systems or combinations of appliances for operating electric drills or other similar reciprocating tools.

The object of the invention is to direct alternately into the two magnetizing coils or coil-sections, with which such tools are usually provided, rising and falling impulses of current; and to this end the invention involves the following essential devices, arranged and combined as hereinafter set forth: first, a generator of rising and falling current impulses; second, a reciprocating drill or tool having two energizing-coils and a magnetic core or plunger; third, a switch or commutating device for connecting the said drill-coils in alternation with the circuit from the generator, and, fourth, a rotary synchronizing-motor actuated by the current of the generator to operate the switch or commutator. In the operation of these devices the switch or commutator is so adjusted as to shift the current from one drill-coil to the other at the moment of lowest difference of potential of the current, and this action is maintained by the fact that the motor operating the switch rotates in synchronism with the generator. By this means sparking is avoided and other advantages gained, as will hereinafter appear.

The accompanying drawing is a diagram of the system. One drill only is indicated; but it is obvious that more than one might be used and operated from the same generator, if so desired.

G represents the armature-coil of an alternating-current generator of the character usually employed for operating reciprocating drills and provided with two collecting-rings $a\ a$, upon which contact springs or brushes bear. The current from this generator is carried off by the circuit L to or near the point at which the drills are located, where it comprises the primary coil P of a converter or transformer C, by which latter device the potential may be lowered, if so desired. The secondary coil S of this converter is connected by one of its terminals to the junction of the two drill-coils or sections of coil D D'. The other terminal is connected by a brush $e$ to an insulated metallic ring $c$, mounted on a suitable shaft A. On the same shaft is a disk $d$, one-half of the periphery of which is of metal and connected to the ring $c$. Two brushes $f\ g$ are in contact with the periphery of disk $d$, and are connected, respectively, with the free terminals of the drill-coils D D'.

M is a small alternating-current motor constructed with reference to the generator G, so as to run in synchronism therewith and preferably at the same rate of speed. The current for operating this motor is taken from either the primary or secondary circuit of the generator G by conductors $b\ b$ and the usual collecting ring and brushes. The shaft of the motor M is connected or geared with that of the disks forming the switch.

When the generator is in operation and the motor M revolving in synchronism therewith, the disks of the switch will be rotated at the same speed, so that the current will be directed alternately through the drill-coils by the contact of the half-ring on disk $d$ with the two brushes $f\ g$ alternately. The position of the disks should be such that the brushes $f\ g$ pass from insulation to metal at the moment of least potential, thereby avoiding sparks and directing a rising and falling impulse of current first into one drill-coil and then into the other.

The relative location of the several devices hereinabove described is largely immaterial; but the motor and switch are preferably located in the vicinity of the drill.

What I claim is—

1. The combination, with a generator of rising and falling currents and a reciprocating drill or tool provided with two magnetizing-coils, of a switch for directing the current alternately through the said coils, and a rotary synchronizing-motor driven by the current and connected with and operating the said switch, as set forth.

2. The combination, with a generator of rising and falling currents, a reciprocating drill or tool provided with two magnetizing-coils, and an electrical transformer or converter intermediate to the generator and the drill, of a switch for directing the secondary current of the transformer alternately through the drill-coils, and a synchronizing-motor driven by the primary or secondary current and connected with and operating the said switch, as set forth.

HARRY N. MARVIN.

Witnesses:
E. D. PALMER,
ABEL S. CLEMENTS.